United States Patent [19]
Hyde

[11] 3,771,054
[45] Nov. 6, 1973

[54] METHOD AND APPARATUS FOR OBSERVING TRANSIENT GYROMAGNETIC RESONANCE

[75] Inventor: James S. Hyde, Stockholm, Sweden

[73] Assignee: Varian Associates, Palo Alto, Calif.

[22] Filed: May 15, 1972

[21] Appl. No.: 253,667

Related U.S. Application Data

[63] Continuation of Ser. No. 29,916, April 20, 1970, abandoned.

[52] U.S. Cl. .............................................. 324/0.5 R
[51] Int. Cl. ............................................ G01n 27/78
[58] Field of Search ..................... 324/0.5 R, 0.5 A, 324/0.5 AC

[56] References Cited
UNITED STATES PATENTS 3,358,222   12/1967   Hyde .................................. 324/0.5
3,469,181   9/1969    Staples .............................. 324/0.5
3,562,631   2/1971    Lee .................................... 324/0.5
3,588,678   6/1971    Ernst .................................. 324/0.5

Primary Examiner—Michael J. Lynch
Attorney—Stanley Z. Cole

[57] ABSTRACT

Gyromagnetic resonance spectrometers and methods of operating same are disclosed wherein gyromagnetic resonance of a sample of matter is excited and detected at a first electron resonance condition repetitively and abruptly purturbating said sample of matter to produce a train of transient resonance responses after said purturbation is removed. Establishing a second electron resonance condition within the sample. The transient response is detected as a function of the relatively slow changes in the electron resonance condition to obtain an output transient resonance spectrum.

22 Claims, 10 Drawing Figures

METHOD AND APPARATUS FOR OBSERVING TRANSIENT GYROMAGNETIC RESONANCE

This is a continuation of application Ser. No. 29,916 filed Apr. 20, 1970, now abandoned.

DESCRIPTION OF THE PRIOR ART

Heretofore, pulsed electron-electron double resonance experiments have been performed wherein one part of an electron paramagnetic resonance spectrum was irradiated with a pulsed source of microwave energy while the resulting transient response was observed at a certain portion of the spectrum. Such an experiment is disclosed in Volume 115 of the Physical Review, page 986, appearing in 1959; Volume 118 of the Physical Review, page 939, appearing in 1960; and Volume 129 Physical Review, page 2,441 appearing in 1963.

It is also known that an electron spin resonance spectrum of a sample can be obtained by pumping the spectrum with a relatively strong RF pump field to saturate resonance of the spectrum while simultaneously probing the spectrum under analysis with weak RF detector field applied at a different frequency, such spectrometer and method of operating same is disclosed in Physical Review, Volume 135, No. 1a of July, 6, 1964, at page A247.

SUMMARY OF THE PRESENT INVENTION

The principal object of the present invention is the provision of improved method and apparatus for observing transient gyromagnetic resonance.

One feature of the present invention is the provision of exciting and detecting gyromagnetic resonance of a sample of matter, and while detecting such resonance, repetitively and abruptly purturbating and removing said purturbation on said sample to produce a train of transient responses in the detected resonance of the sample, changing the electron resonance condition within the sample with a time rate of change slower than the abrupt purturbations, and detecting the changes in the transient resonance response as a function of changes in the electron resonance condition.

Another feature of the present invention is the same as the preceding feature wherein the purturbation includes one or more of the following conditions: irradiation of the sample either in the optical or radio frequency spectrum, temperature of the sample, electrical current passing through the sample, and phase of the RF energy applied to the sample.

Another feature of the present invention is the same as any one or more of the preceding features wherein the electron resonance condition, which is changed at a relatively slow rate, is a function of the polarizing magnetic field intensity or the frequency of an alternating RF field applied to the sample to excite resonance.

Another feature of the present invention is the same as any one or more of the preceding features wherein the changes in the transient response due to the relatively slow changes in the electron resonance condition are separately detected for different transient components, if any, present in the transient resonance response, and at least one of the transient components is selected and detected as a function of the change in the electron resonance condition.

Other features and advantages of the present invention will become apparent upon a perusal of the following specification taken in connection with the accompanying drawings wherein:

DESCRIPTION OF THE PREFERRED EMBODIMENTS

Figure 1:
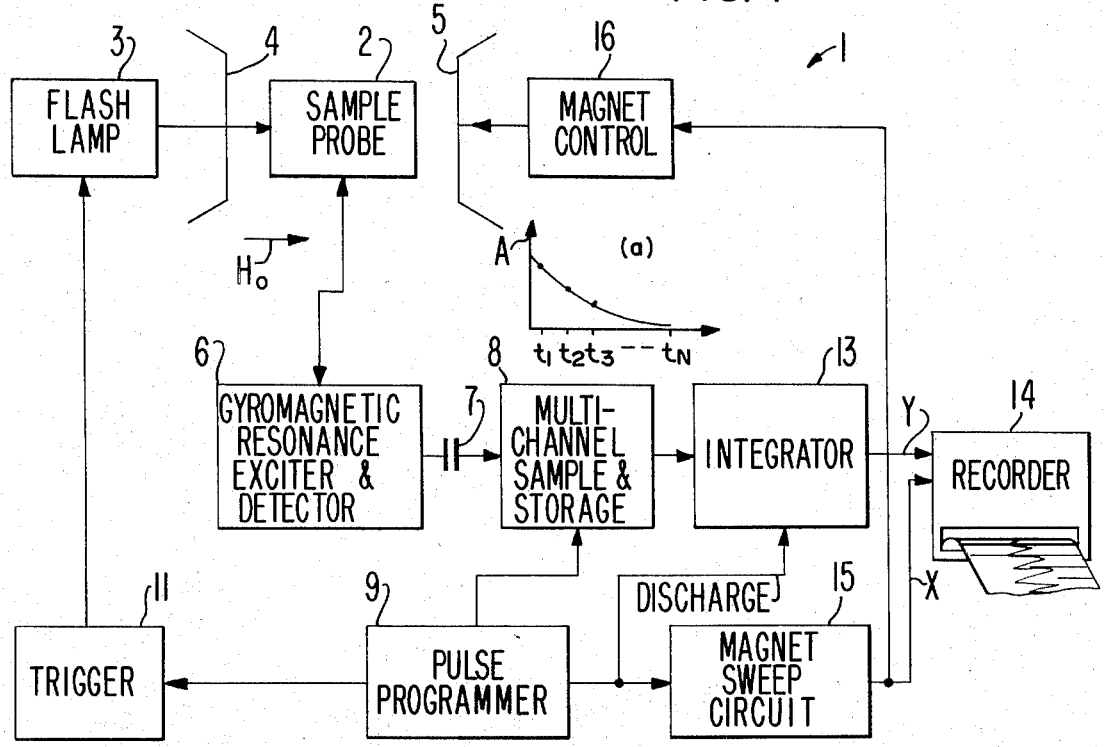
FIG. 1 is a schematic block diagram of a gyromagnetic resonance spectrometer incorporating features of the present invention.

Referring now to FIG. 1, there is shown an electron paramagnetic resonance spectrometer 1 incorporating features of the present invention. The spectrometer 1 includes a sample probe structure 2 having a gyromagnetic resonance sample material disposed in RF magnetic field exchanging relation with a resonant circuit for exciting and detecting gyromagnetic resonance of the sample material. The resonant circuit comprises a cavity resonator having a light transmissive wall portion for irradiation of the sample by a flash lamp 3. A magnet having pole pieces 4 and 5 produced an intense DC magnetic field within the sample. Each line in an EPR sample spectrum represents an electron resonance condition obtained by establishing the exciting frequency and polarizing field such that gyromagnetic resonance occurs.

A gyromagnetic resonance exciter and detector is coupled to the resonant circuits within the probe 2 for exciting and detecting gyromagnetic resonance of the sample material. The gyromagnetic resonance exciter and detector 6 supplies a radio frequency magnetic field to the sample at an angle to the polarizing magnetic field, the frequency of the radio frequency magnetic field being such as to produce gyromagnetic resonance of the gyromagnetic bodies within the sample material for the particular value of the polarizing field. The resonance of the sample is detected in the gyromagnetic resonance exciter and detector and the transient resonance signals are fed by a coupling capacitor 7 to the input of a multichannel sample and storage unit 8.

In a typical example of the present invention, the gyromagnetic resonance bodies are electrons, the radio frequency magnetic field has a frequency on the order of 10 $GH_z$ and as an aid in detecting resonance, the magnetic field is modulated at a relatively high frequency, such as 100 $KH_z$ to permit synchronous detection of the 100 $KH_z$ component in the resonance signal. Alternatively, if the transient response to be investigated is sufficiently rapid, magnetic field modulation may be eliminated since low frequency noise components of the response distorted by the detector will not pass the coupling capacitor.

A pulse programmer 9 produces a train of output pulses which are fed to a trigger 11 which in turn produces a train of trigger pulses fed to the flash lamp 3 such as an xenon flash tube, which produces an output train of purturbating light flashes which are applied to the sample gyromagnetic resonance material within the polarizing magnetic field $H_0$. In a typical example, output flashes from lamp 3 have a repetition rate of 10 per second, each flash from the lamp having a duration, of 10 microseconds. Each flash from the lamp 3 produces a corresponding transient change in the continuously detected resonance of the sample material if the sample is light sensitive. Thus, a train of transient resonance responses is obtained in the output of the gyromagnetic resonance exciter and detector which is coupled to the input of the multichannel sample and storage 8. Each transient response in the train of transient responses has a characteristic envelope such as depicted by curve 12 of the waveform diagram (a). The multichannel sample and storage unit 8 is synchronized with each transient response via an input from the pulse programmer 9. The multichannel sample and storage unit 8 samples each transient response signal 12 at a number of time displaced intervals indicated at $t_1, t_2, t_3 \ldots t_N$. Each sampled response amplitude is stored in a separate respective channel of the multichannel storage unit 8. After one or more of the transient responses 12 has been sampled and stored in the multichannel sample and storage unit, the outputs of the respective channels are fed into the input of an integrator 13 which integrates the output of each of the channels to obtain a total output which is fed to one input of a recorder 14.

After one or more of the transient responses 12 has been integrated by the integrator 13, the pulse programmer 9 sends a pulse to the integrator, thereby discharging same, and also at the same time sends a pulse to a magnetic sweep circuit 15 which produces an output to a magnet control unit 16 for changing the magnitude of the polarizing magnetic field $H_0$ to a new value slightly different from the intensity of the polarizing magnetic field in the sample used to derive the first train of transient responses, thereby changing the electron resonance condition. At the same time, a sample of the output of the magnetic sweep circuit 15 is fed to the recorder 14 for recording the output of the integrator 13. The pulse programmer 9 periodically advances the magnetic field intensity until the magnetic field intensity has been swept in a successive number of discrete steps through the electron resonance condition spectrum of the sample under analysis. The result is a recorded output spectrum of the transients of resonance lines which are sensitive to light. Other resonance lines in the sample which are not sensitive to light would be suppressed in the recorded spectrum.

If the multichannel sample and storage unit 8 is set to accumulate the output of a number of transient responses before the pulse programmer 9 advances the magnetic field, a time average of the output transient responses is obtained, thereby improving the signal to noise ratio of the final output recorded spectrum. One advantage of the spectrometer of FIG. 1 is that, provided the alternative of no magnetic field modulation is employed, the recorded resonance lines are pure absorption mode resonance and not "derivative like" first harmonic output signals of a phase sensitive detector.

As an alternative to sweeping the magnetic field, the output of the pulse programmer 9 may be applied for changing the frequency of the exciting radio frequency magnetic field applied to the sample. This changes the electron resonant condition in the same manner as a change in the magnetic field.

As still another alternative to the spectrometer of FIG. 1, the flash lamp 3 need not irradiate the sample material with optical radiation but the purturbation may be a pulsed microwave source which sharply raises the temperature of the sample material due to dielectric heating within the sample. As another alternative the flash lamp 3 may be replaced by an electrical discharge device for producing a pulse or step of current or voltage through the sample material within the probe 2. In each of the above alternatives, the transient response in the detected resonance of the sample material in response to the abrupt purturbation in the temperature, the current, voltage or the like applied to the sample is detected and fed to the multichannel sample and storage unit 8 for analysis as above described. In each of the aforementioned alternatives, the recorded output spectrum, obtained from recorder 14, comprises a spectrum of the transients of resonance line signals which are sensitive to the resonance affecting purturbation such as light, temperature, phase of the RF, voltage, current, etc.

In another alternative embodiment of the spectrometer of FIG. 1, the multichannel sample and storage unit 8 may be deleted and the output of the coupling capacitor 7 merely fed to the input of the integrator 13 for integrating the area under curve 12. The pulse programmer 9 would discharge the energy of the integrator 13 after integration of each of the output transient responses and before advancing to the magnetic field via the magnetic sweep circuit 15.

In another embodiment of the spectrometer of FIG. 1, the multichannel sample and storage unit 8 takes only a selected one sample out of each transient resonance response 12, such sampling time may be arbitrarily chosen as any one of the channels of the sample and storage unit 8. This representative channel is then employed for sampling each successive transient resonance response 12 and the sampled output is stored for a succession of transient resonance responses 12 for a given electron resonance condition. The sampled amplitudes are accumulated in the selected channel to obtain a time average and the accumulated total is read out directly to the recorder 14 without the necessity of integrator 13.

Figure 2:
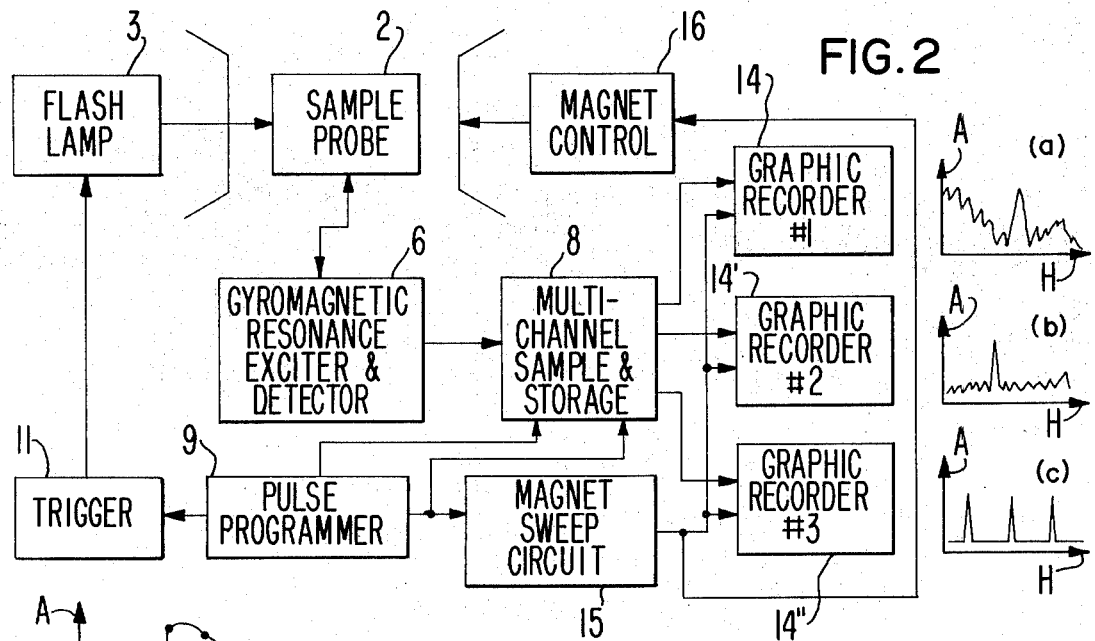
FIG. 2 is a schematic block diagram, similar to the block diagram of FIG. 1, depicting an alternative embodiment of the present invention.
Figure 3:
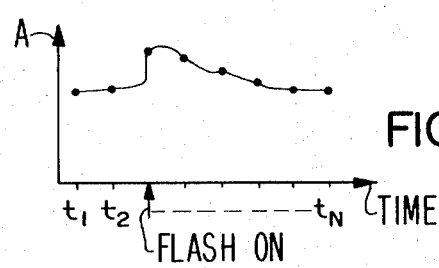
FIG. 3 is a plot of the detected resonance signal as a function of time for the spectrometer system of FIG. 2.

Referring now to FIG. 2, there is shown an alternative spectrometer of the present invention. The spectrometer of FIG. 2 is essentially the same as that of FIG. 1 with the exception that the coupling capacitor 7 between the gyromagnetic resonance exciter and detector 6 and the input to the multichannel sample and storage unit 8 has been deleted such that an output including the DC resonance is fed to the multichannel storage unit 8 with the transient response superimposed thereon, as shown in FIG. 3. This configuration employs magnetic field modulation and phase sensitive detection. This resonance signal is characterized by a more or less continuous DC resonance signal level with the transient response superimposed thereon, there being a transient resonance response following each of the pulses of the lamp 3.

The multichannel sample and storage unit 8 is synchronized by the pulse programmer 9 in such a manner that the sampling times for the output resonance signal, $t_1, t_2, t_3 \ldots t_N$, start slightly before the initiation of the light flash from lamp 3 and continue for a time after the transient response has returned to the DC level. A number of the transient responses are sampled and stored in the storage unit 8 such that the results for the various channels are accumulated in order to obtain a time averaged output having improved signal to noise ratio. Alternatively, each transient output may be sampled and read directly to the output of the multichannel sample and storage unit 8.

Certain ones of the selected storage channels, corresponding to measurements of the resonance signal before initiation of the flash are fed to a Y-axis of a first recorder 14 for recording as a function of the magnetic field intensity. Certain others of the channels corresponding to the transient response are read out to the Y-axis of a second recorder 14', and a third number of channels corresponding to the period following the transient response are read out and fed to the Y-axis of a third recorder 14''. The result is three separate recorded output spectra (a), (b), (c). By comparison of the output spectra (a), (b), and (c) valuable information is obtained concerning the transient response of the sample material to the pulsed irradiation.

As in the spectrometer of FIG. 1 the flash lamp may be replaced by any one of a number of other devices for changing the resonance affecting conditions over the sample in a transient and abrupt manner. Suitable alternatives for the flash lamp 3 include a pulsed microwave source, or a pulse of current or voltage through the sample material. As an alternative to the use of N number of graphic recorders 14 the resonance data output of the multichannel sample and storage unit 8 may be stored on a tape recorder or in a computer memory and displayed at a later time on a graphic recorder or printed out in digital form.

Figure 4:
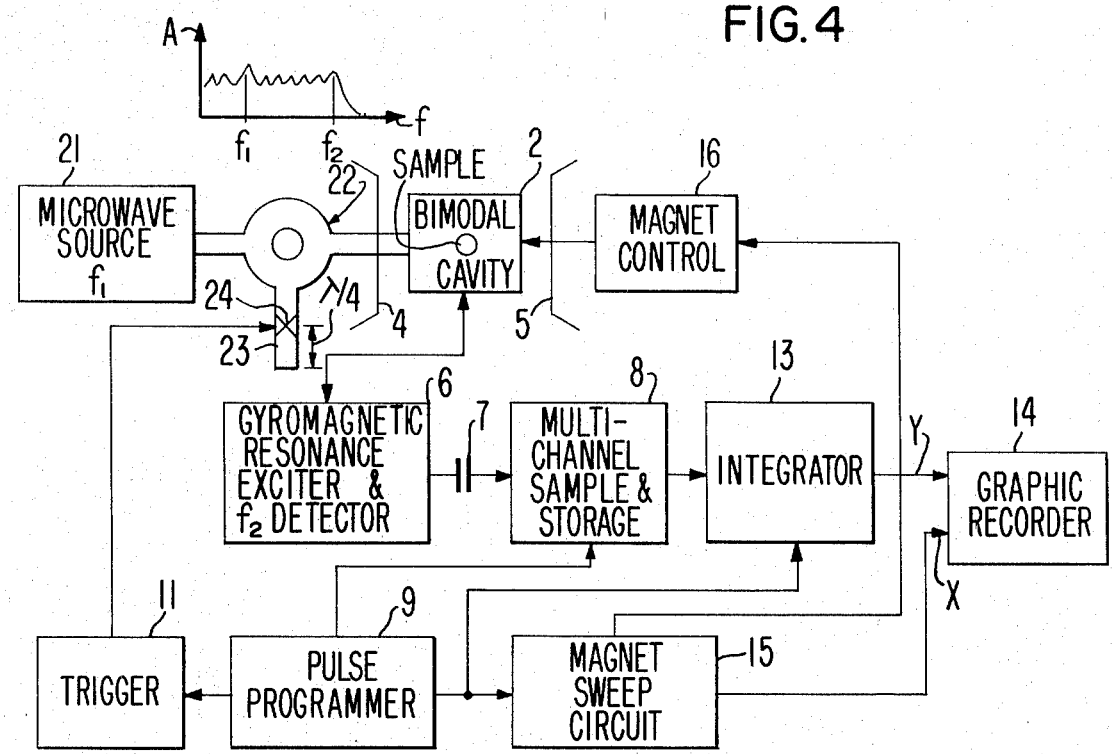
FIG. 4 is a schematic block diagram of an electron paramagnetic resonance spectrometer incorporating features of the present invention.

Referring now to FIG. 4, there is shown an alternative electron paramagnetic resonance spectrometer incorporating features of the present invention. The spectrometer of FIG. 4, is essentially the same as the spectrometers of FIGS. 1 and 2 with the exception that the flash lamp 3 is replaced by a microwave source 21 and the amplitude of microwave radiation applied to the sample is not altered but instead the phase of the microwave energy is abruptly and repetitively shifted by a relatively large phase angle, as of 180°, to produce a train of transient responses in the resonance of the sample being monitored. More particularly, the microwave source 21 supplies microwave energy at a frequency of $f_1$ suitable for excitation of gyromagnetic resonance of a sample of material under analysis. A typical spectrum for such a sample is shown by waveform A. The microwave energy is fed into a three port circulator 22 having a diode switch placed one quarter of a wave length from a shorted end of a waveguide attached to one port of the circulator such that when the diode 24 is fired by the output of the trigger 11, the microwave energy, instead of being reflected from the shorted end of arm 23 is reflected from the diode 24, such that now the phase of the wave energy passing out of the circulator to the sample is abruptly shifted by 180°.

The probe structure 2 includes a bimodal cavity having the sample material disposed in a region common to two orthogonal modes of osciallation, one of the modes being the pumping mode and being connected to the output of the circulator 22. The other mode of the cavity is coupled to the gyromagnetic resonance exciter and detector 6 which excites resonance of the sample material at either the same frequency of the microwave source, namely $f_1$ or at any other frequency $f_2$ suitable for excitation of gyromagnetic resonance within the spectrum of the sample under anaylsis.

The abrupt change in the phase of the pumping energy applied to the sample produces a transient response in the resonance of the line being detected and the transient response is coupled via coupling capacitor 7 to the multichannel sample and storage unit 8. As in the previous spectrometer embodiments, the sampled transient resonance responses can be time averaged and integrated or merely time averaged or merely sampled, with the output being fed to the Y-axis of the X-Y recorder 14 for recording against the sweep of the electron resonance condition to obtain an output spectrum of the transient responses produced by the train of abrupt changes in the phase of the microwave energy employed for pumping the sample.

Figure 5:
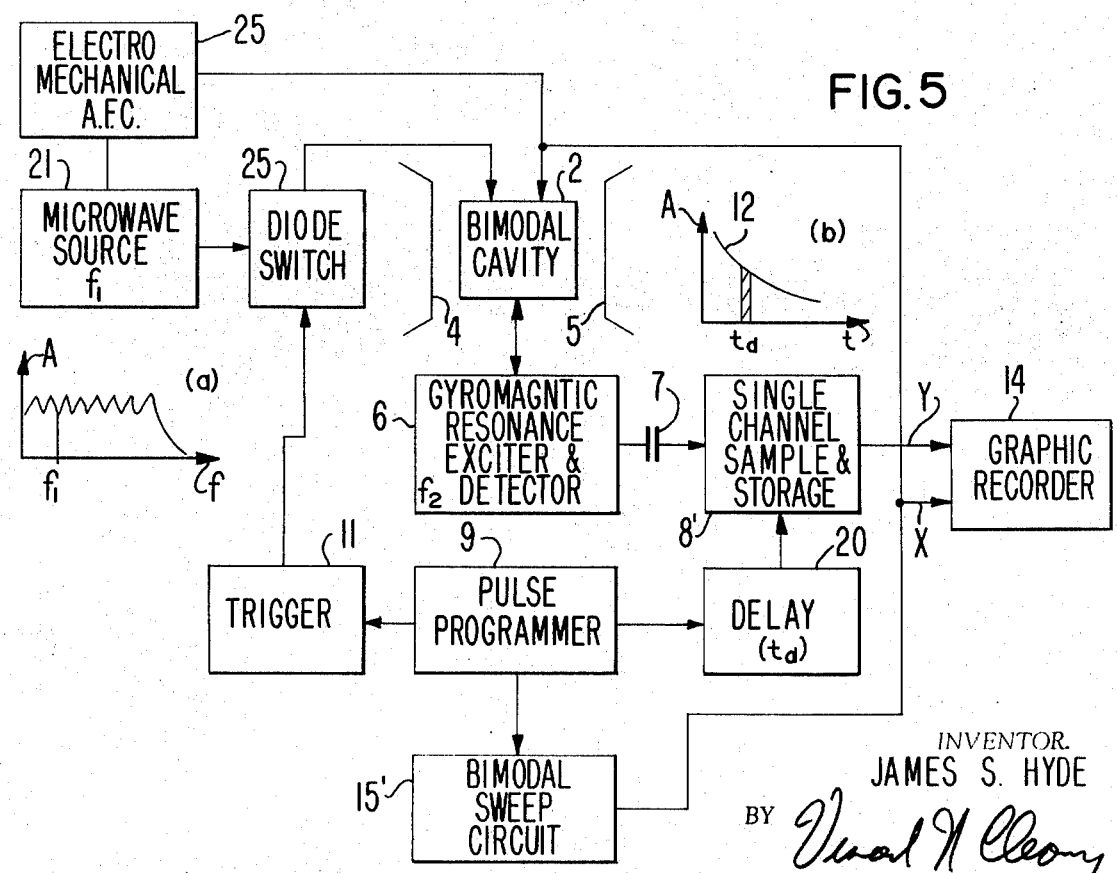
FIG. 5 is a schematic block diagram depicting an alternative spectrometer embodiment incorporating features of the present invention.

Referring now to FIG. 5 there is shown a gyromagnetic resonance spectrometer similar to that of FIG. 4. The apparatus is essentially the same as that of FIG. 4 with the exception that the phase of the microwave energy applied for pumping the sample is not changed but rather the amplitude of the microwave energy applied for RF pumping of the sample is changed abruptly from a first RF level of sufficient amplitude to produce saturated resonance of a spectral line of the sample to a much lower amplitude, such as 30 db below the saturation RF amplitude to produce a transient resonance response in the excited and detected gyromagnetic resonance of the sample.

Gyromagnetic resonance exciter and detector 6 excites resonance of a line of the resonance sample, namely $f_2$. The resonant sample is purturbated by pulsing the pump power which is of radiofrequency $f_1$ and the train of transient responses produced in the detected resonance is coupled via coupling capacitor 7 to the input of a single channel sample storage unit 8. The microwave energy at $f_1$ from microwave source 21 is pulsed to the lower level by means of diode switch 25 in response to the output of trigger 11.

Each transient response, indicated by curve 12 of waveform (b), is sampled at some predetermined point, such as point $t_d$ which is selected by means of a pulse derived from pulse programmer 9 and delayed by a suitable delay time $t_d$ in time delay 20 corresponding to the desired sampling time $t_d$ following initiation of each transient response. A plurality of successive transient responses are sampled at the same point and the sampled amplitude is accumulated in the single channel sample and storage unit 8. The accumulated total, which corresponds to a time average of the transient resonance response is fed to the Y-axis of the X-Y recorder 14 for recording as a function of the difference between the frequency of the pumping source and the resonance exciting and detecting frequency. Either the detecting frequency or, alternatively, the frequency of the pumping source is swept in accordance with the output of the pulse programmer 9. More particularly, sweep circuit 15' changes the tuning of the receiver mode cavity or, alternatively, the pumping mode cavity in the bimodal cavity portion of the probe 2. An electro-mechanical frequency control 25 also causes the microwave source 6 or, alternatively, 21 to shift frequency to track the tuning of the bimodal cavity such that the frequency $f_1$ of the microwave source 21 or, alternatively, the frequency $f_2$ of the gyromagnetic resonance exciter and detector 6 shifts across the spectrum of the sample under analysis.

The result is an output spectrum of improved resolution as compared to that obtained from a conventional electron spin spectrometer. The spectrum is a pure absorption spectrum due to the transient nature of the resonance signals being recorded. All the reasons for the substantial improvement in resolution of the output spectrum are not fully understood. In a typical example, the abrupt change in the RF level of the microwave source as fed to the bimodal cavity for pumping the sample, shifts from the high intensity saturation level to the non-saturation low intensity level in approximately 100 nanoseconds, as before, the repetition rate for the abrupt change in RF level is approximately 10 per second. Upon the termination of each transient output signal the RF level is returned via pulse programmer 9 and trigger 11 to the high intensity level and the RF level remains at the high intensity level for sufficiently long time for saturation of the sample to reach equilibrium. Typically this is on the order of 100 microseconds.

In an alternative embodiment of the purturbation spectrometer of FIG. 5, the frequency $f_1$ of the pumping microwave source is approximately the same as or, alternatively, coherent with or, alternatively, different from the frequency $f_2$ of the gyromagnetic resonance exciter and detector 6 and the applied polarizing magnetic field is swept by the pulse programmer. The resulting transient response is obtained as previously and displayed on the graphic recorder 14 as a function of the polarizing magnetic field.

Figure 6:
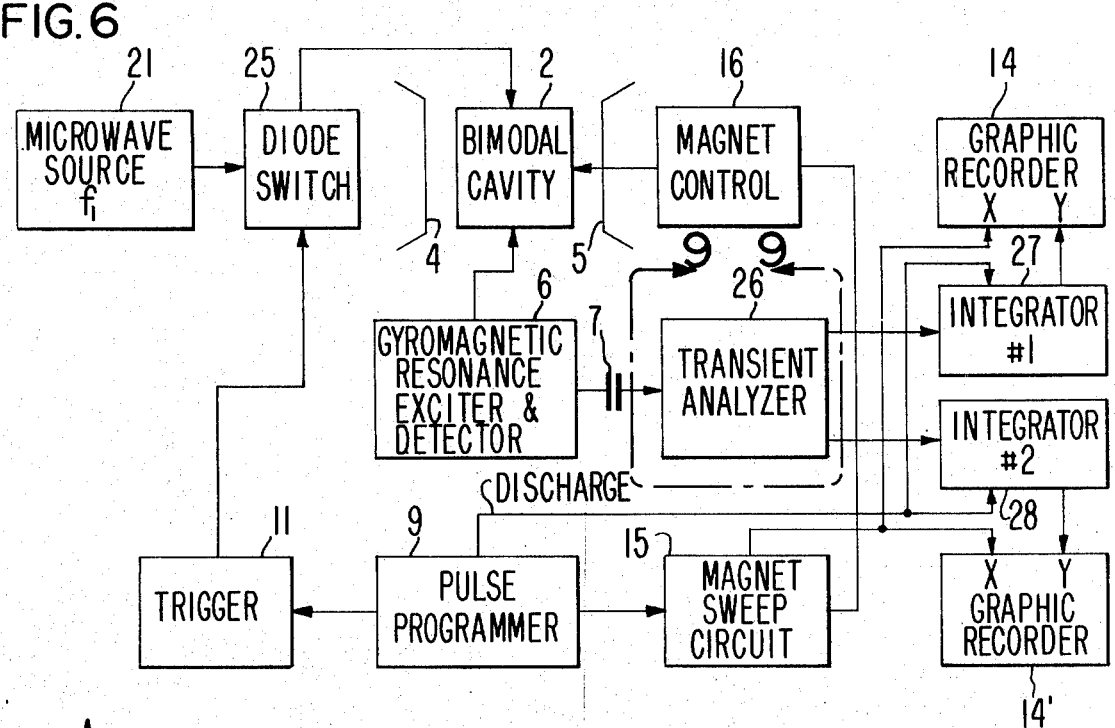
FIG. 6 is a schematic block diagram of further electron paramagnetic resonance spectrometer incorporating features of the present invention.
Figure 8:
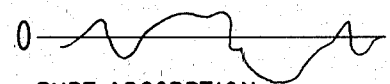
FIG. 8 is a plot of three output spectra derived from the spectrometer FIG. 6 and depicting different frequency components of the composite transient resonance responses.
Figure 8:

Referring now to FIG. 6 there is shown an alternative gyromagnetic resonance spectrometer incorporating features of the present invention. The spectrometer of FIG. 6 is substantially the same as that of FIG. 4 with the exception that the intensity of the microwave source is pulsed, as previously disclosed spectrometer of FIG. 5. The resultant train of transient output resonance signals are fed via coupling capacitor 7 to the input of a transient analyzer 26 which separates transients having different time constants. The separated output transient components from transient analyzer 26 are fed to separate integrators 27 and 28' for integrating the separated transient components. The integrated outputs are fed to separate recorders 14 and 14' for recording separately the separated transient signals. After the analysis of each transient output signal, the pulse programmer 9 pulses the magnetic sweep current 15 to change the electron resonance condition to observe the transient resonance of a different portion of the spectrum of the sample under analysis. A sample of the sweep circuit output is fed to the X axis of the respective recorders 14 and 14' to obtain seprate output spectra as shown by spectra 2 and 3 of FIG. 8. The conventional ordinary electron spin resonance spectrum is shown by spectrum 1 of FIG. 8.

Figure 7:
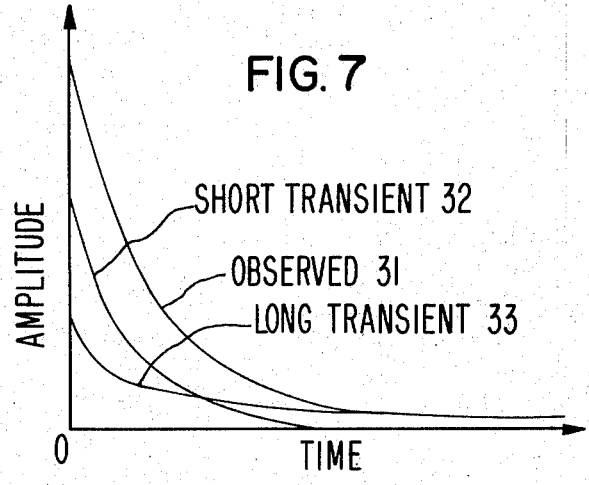
FIG. 7 is a plot of resonance signal amplitude versus time depicting the transient output signal obtained in a portion of the spectrometer of FIG. 6.
Figure 9:
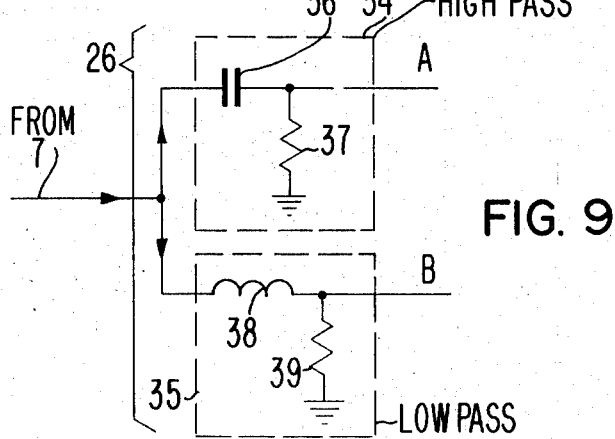
FIG. 9 is a schematic circuit diagram, partly in block diagram form, depicting a portion of the spectrometer of FIG. 6 delineated by line 9—9.

Referring now to FIGS. 7 and 9 the transient analyzer 26 will be more fully disclosed. Each transient output from the output of gyromagnetic resonance exciter and detector 6 may comprise a signal having a transient envelope of decaying amplitude as shown by curve 31 of FIG. 7. Curve 31 represents a composite transient signal, such as that produced by super-position of a short transient signal 32 and a long transient signal 33. The transient analyzer 26 comprises a parallel connection of a high pass filter 34 and a low pass filter 35. High pass filter comprises a series capacitor 36 and shunt resistor 37, whereas the low pass filter 35 comprises series inductance 38 and shunt resistor 39. High pass filter 34 separates the short transient component from the composite transient resonance signal 31 and feeds the short transient to the first integrator 27. The low pass filter 35 separates the long transient output signal 33 from the composite resonance signal 31 and feeds long transient component to the second integrator 28.

As an alternative to analyzer 26, the composite transient signal is decomposed into the sum of two or more transient exponential functions in a digital computer. The separated exponential functions may then each be integrated independently in the computer by digital techniques and the output converted to analog form and recorded on an X-Y recorder to obtain the output spectra 2 and 3 of FIG. 8. The spectrometer of FIG. 6 is especially useful for separating the spectra of two gyromagnetic groups having overlying spectrums. For example, electrons in the resonance sample may be related to two radical systems having overlying resonance spectra. The spectra are readily separated according to their time constants.

Figure 10:
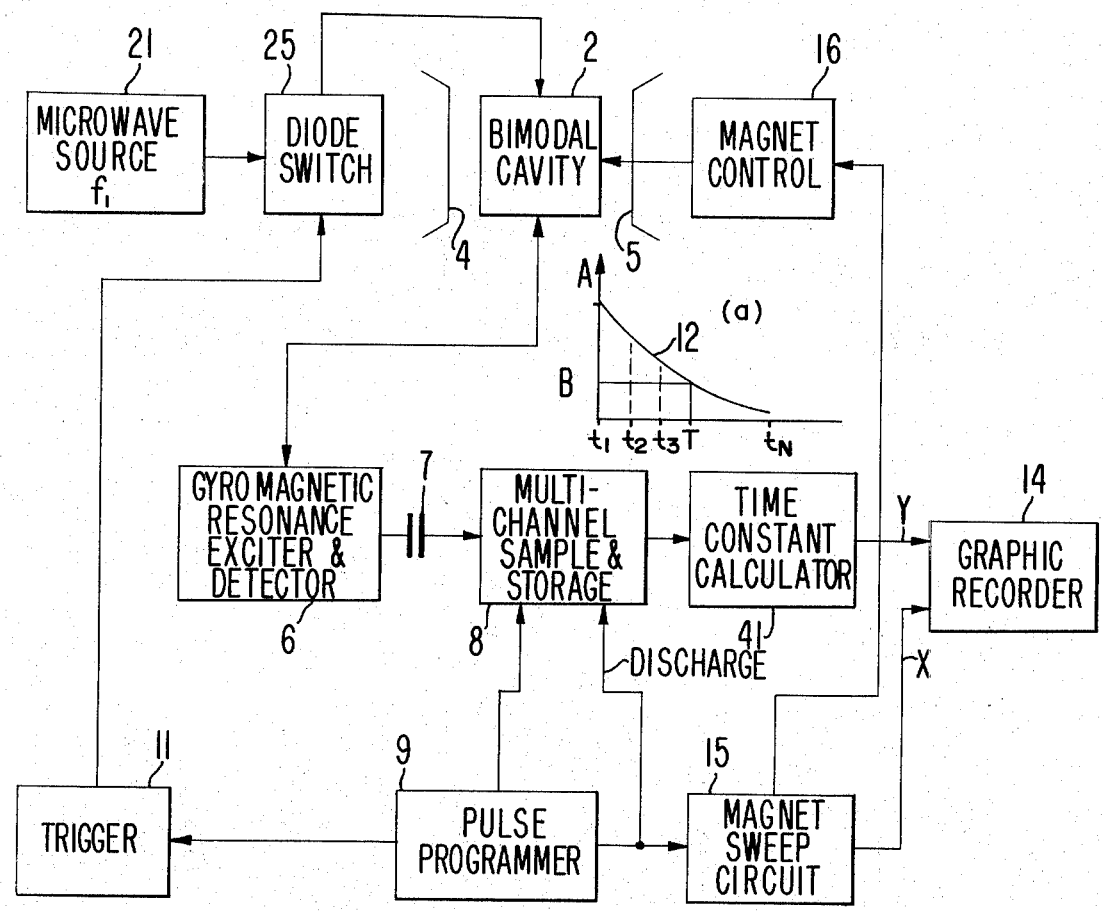
FIG. 10 is a schematic block diagram of an electron paramagnetic spectrometer incorporating features of the present invention.

Referring now to FIG. 10 there is shown an alternative spectrometer embodiment of the present invention. The spectrometer of FIG. 10 is essentially the same as that of FIG. 6 with the exception that the output of capacitor 7 is fed to the input of a multichannel sample and storage 8 which samples each transient resonance response, 12 as indicated in waveform (a), at a number of time displaced sampling points with each sampling point corresponding to a specific channel of the sample and storage 8. Successive transient resonance responses for a given electron resonance condition, i.e., magnetic field intensity, are accumulated in the multichannel sample and storage 8 for time averaging to improve the signal to noise ratio. Periodically the output of the multichannel sample and storage unit 8 is fed to the input of a time constant calculator 41, such as a digital computer, which measures the response in the first channel, that response being A, and utilizes this value of A to calculate a value B which is $1/e$ A. The computer then compares the calculated value B with the measured values in the various channels to arrive at the time constant T, i.e., the time at which the signal amplitude has decayed to the value of B. The computer then generates a voltage proportional to T and this time constant T is recorded on the Y-axis of recorder 14 as a function of the magnetic field intensity derived from the output of magnetic sweep circuit 15 to obtain an output spectrum of the sample under analysis. In the spectrum, the separate line signals have amplitudes in variable accordance with the time constants of the various lines.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. A method for obtaining a display of changes in purturbation induced transients of electron cyromagnetic resonance as a function of electron resonance condition, the steps comprising:
   a. continuously exciting and detecting electron gyromagnetic resonance of a sample of matter at a first electron resonance condition;
   b. applying an abrupt purturbation to said sample of matter and commencing periodic sampling and storage of electron gyromagnetic resonance signal at predetermined intervals;
   c. discontinuing application of said abrupt purturbation to said sample while continuing said periodic sampling and storage of said electron gyromagnetic resonance signal;
   d. establishing a second electron resonance condition and continuously exciting and detecting electron gyromagnetic resonance of said sample of matter at said second electron resonance condition;
   e. repeat steps (b)
   f. repeat step (c)
   g. compare the detected signals of steps (b) and (c) respectively with the detected signals of steps (e) and (f) and
   h. display the comparison determined in step (g) as a function of electron resonance condition.

2. The method of claim 1 wherein steps (b) and (c) are repeated a plurality of times for each electron resonance condition in order to obtain signal-to-noise improvement by time-averaging.

3. The method of claim 1 wherein the abrupt purturbation of step (b) is an induced temperature jump.

4. The method of claim 2 wherein the abrupt purturbation of step (b) is an induced temperature jump.

5. The method of claim 1 wherein the abrupt purturbation of step (b) is radiation at optical wavelengths.

6. The method of claim 2 wherein the abrupt purturbation of step (b) is radiation at optical wavelengths.

7. The method of claim 1 wherein the abrupt purturbation of step (b) is a step in the phase of a microwave pumping source, said microwave source being at the frequency associated with the electron resonance condition.

8. The method of claim 2 wherein the abrupt purturbation of step (b) is a step in the phase of a microwave pumping source, said microwave pumping source being at the frequency associated with the electron resonance condition.

9. The method of claim 1 wherein the abrupt purturbation of step (b) is a step in the amplitude of a microwave pumping source, said microwave pumping source being at the frequency associated with the electron resonance condition.

10. The method of claim 2 wherein the abrupt purturbation of step (b) is a step in the amplitude of a microwave pumping source, said microwave pumping source being at a frequency associated with the electron resonance condition.

11. The method of claim 1 wherein the abrupt purturbation of step (b) is a step in the amplitude of a microwave pumping source, said microwave pumping source being at a frequency different from the frequency associated with said electron resonance condition.

12. The method of claim 2 wherein the abrupt purturbation of step (b) is a step in the amplitude of a microwave pumping source, said microwave pumping source being at a frequency different from the frequency associated with said electron resonance condition.

13. In apparatus for observing electron paramagnetic resonance including a means for holding a sample of matter under test in a polarizing magnetic field and a means for applying an RF magnetic field at a frequency to excite an electron resonance condition in said sample and to detect gyromagnetic resonance of said sample, the improvement comprising
   means to periodically purturbate said sample;
   means to sample and store said detected gyromagnetic resonance signals following the discontinuance of said purburbation;
   means to step through differing values of electron resonance condition of said sample responsive to each cycle of said programmer;
   programmer means for synchronizing said purturbation of said sample and said sampling and storage of said detected gyromagnetic resonance signal and said stepping of said electron resonance condition;
   means to compare the stored gyromagnetic resonance signals for each said step of said electron resonance condition; and
   means for displaying said comparison of said detected gyromagnetic resonance signals as a function of electron resonance condition.

14. The apparatus of claim 13 wherein the means to abruptly purturbate is a flash lamp having radiation in the visible wavelengths.

15. The apparatus of claim 13 wherein the means to abruptly purturbate is a heater.

16. The apparatus of claim 14 wherein the means to abruptly purturbate is a microwave pumping source including means to phase switch energy from said source which impinges upon said sample.

17. The apparatus of claim 14 wherein the means to abruptly purturbate is a microwave pumping source including means to amplitude step energy from said source which impinges upon said sample.

18. Apparatus for observing purturbation-induced transients in the electron gyromagnetic resonance of a sample of matter comprising,
   programming means;
   means for continuously exciting electron gyromagnetic resonance of said sample of matter at selected electron resonance conditions; said electron resonance conditions being responsive to said programming means;
   means for abruptly and periodically purturbating said sample and for discontinuing said purturbations responsive to said programmer means;
   means for detecting said gyromagnetic resonance signal at a predetermined time interval after discontinuance of said purturbation, said detected signal being said transient in the electron gyromagnetic resonance;

means for comparing said detected transient gyromagnetic resonance signal at a first selected electron resonance condition to a corresponding detected transient gyromagnetic resonance signal at a second selected electron resonance condition, and means to display said comparison of corresponding detected signals.

19. The apparatus of claim 18 wherein said means for comparing includes means for separating each said detected transient into its component frequencies.

20. The apparatus of claim 18 wherein said means for comparing includes means for sample and storage of the amplitude of said detected gyromagnetic resonance signal.

21. The apparatus of claim 20 wherein means for comparison further includes a time constant calculator and wherein said display means includes means for displaying said time constants as a function of electron resonance condition.

22. The apparatus of claim 18 wherein said means for comparing includes means for periodic sample and storage of the amplitudes of said detected gyromagnetic resonance signal to time-average a plurality of detected transient signals for each value of electron resonance condition.

* * * * *